US012621728B2

(12) United States Patent
Choi et al.

(10) Patent No.: US 12,621,728 B2
(45) Date of Patent: May 5, 2026

(54) BASE STATION FOR DETECTING ABNORMALITY OF CELL COVERAGE AND OPERATING METHOD THEREOF

(71) Applicant: Samsung Electronics Co., Ltd., Suwon-si (KR)

(72) Inventors: Bumgon Choi, Suwon-si (KR); Byoungha Yi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 461 days.

(21) Appl. No.: 18/152,518

(22) Filed: Jan. 10, 2023

(65) Prior Publication Data

US 2023/0224775 A1      Jul. 13, 2023

Related U.S. Application Data

(63) Continuation of application No. PCT/KR2023/000178, filed on Jan. 4, 2023.

(30) Foreign Application Priority Data

Jan. 10, 2022      (KR) ........................ 10-2022-0003588
Jan. 26, 2022      (KR) ........................ 10-2022-0011782

(51) Int. Cl.
*H04W 4/00* (2018.01)
*H04W 36/00* (2009.01)
*H04W 36/08* (2009.01)

(52) U.S. Cl.
CPC ........ *H04W 36/0072* (2013.01); *H04W 36/08* (2013.01)

(58) Field of Classification Search
CPC .. H04W 36/00; H04W 36/0072; H04W 36/08
See application file for complete search history.

(56) References Cited

U.S. PATENT DOCUMENTS 8,442,537 B2      5/2013   Park et al.
8,670,424 B2      3/2014   Park et al.
(Continued)

FOREIGN PATENT DOCUMENTS

CN      103379539 A      10/2013
CN      104394551 A      3/2015
(Continued)

OTHER PUBLICATIONS

Extended European Search Report dated Mar. 11, 2025; European Appln. No 23737384.0-1215 / 4447533 PCT/KR2023000178.
(Continued)

*Primary Examiner* — Elisabeth Benoit Magloire
(74) *Attorney, Agent, or Firm* — Jefferson IP Law, LLP

(57) ABSTRACT

A device and a method for detecting abnormality in cell coverage in a wireless communication system are provided. A base station includes a communication interface, a memory, and a processor operatively coupled to the communication interface and the memory. The processor is configured to obtain information related to an abnormal area from a network management device. The processor is configured to identify, in a case in which a user equipment (UE) handovers from another base station to the base station, whether the abnormal area is provided by the other base station based on the information related to the abnormal area. The processor is configured to detect, in a case in which the abnormal area is provided by the other base station, whether cell coverage of the base station is affected by the abnormal area provided by the other base station, based on information related to timing advance (TA) of the other base station.

20 Claims, 5 Drawing Sheets

(56) References Cited

U.S. PATENT DOCUMENTS

| | | | | |
|---|---|---|---|---|
| 9,204,412 | B2 * | 12/2015 | Vargantwar | H04W 56/0045 |
| 9,877,213 | B1 * | 1/2018 | Wang | H04W 4/02 |
| 10,624,015 | B2 | 4/2020 | Duan | |
| 10,827,367 | B2 | 11/2020 | Shekalim et al. | |
| 10,939,444 | B1 * | 3/2021 | Bellamkonda | H04W 24/02 |
| 10,986,546 | B2 | 4/2021 | Wang et al. | |
| 11,277,777 | B2 | 3/2022 | Feder et al. | |
| 2012/0165023 | A1 | 6/2012 | Park et al. | |
| 2016/0029253 | A1 | 1/2016 | Sarkar et al. | |
| 2016/0037370 | A1 * | 2/2016 | Futaki | H04W 16/18 |
| | | | | 370/252 |
| 2017/0223690 | A1 * | 8/2017 | Zeng | H04W 4/06 |
| 2018/0160345 | A1 | 6/2018 | Levinkron et al. | |
| 2019/0215700 | A1 | 7/2019 | Sofuoglu | |
| 2019/0246292 | A1 | 8/2019 | Shekalim et al. | |
| 2023/0022247 | A1 * | 1/2023 | Lundén | H04W 16/18 |
| 2023/0024479 | A1 * | 1/2023 | Ciochina | H04B 7/18541 |
| 2023/0058517 | A1 * | 2/2023 | Nakarmi | H04W 12/082 |

FOREIGN PATENT DOCUMENTS

| | | | | | |
|---|---|---|---|---|---|
| CN | 109982351 | A | | 7/2019 | |
| CN | 109982351 | B | * | 4/2022 | H04W 24/10 |
| EP | 3 541 107 | A1 | | 9/2019 | |
| KR | 10-2011-0085274 | A | | 7/2011 | |
| KR | 10-2012-0071514 | A | | 7/2012 | |
| KR | 10-2267417 | B1 | | 6/2021 | |
| WO | 2016/165435 | A1 | | 10/2016 | |
| WO | 2021/013367 | A1 | | 1/2021 | |

OTHER PUBLICATIONS

International Search Report with Written Opinion and English translation dated Apr. 11, 2023; International Appln. No. PCT/KR2023/000178.

* cited by examiner

BASE STATION FOR DETECTING ABNORMALITY OF CELL COVERAGE AND OPERATING METHOD THEREOF

CROSS-REFERENCE TO RELATED APPLICATION(S)

This application is a continuation application, claiming priority under § 365(c), of an International application No. PCT/KR2023/000178, filed on Jan. 4, 2023, which is based on and claims the benefit of a Korean patent application number 10-2022-0003588, filed on Jan. 10, 2022, in the Korean Intellectual Property Office, and of a Korean patent application number 10-2022-0011782, filed on Jan. 26, 2022, in the Korean Intellectual Property Office, the disclosure of each of which is incorporated by reference herein in its entirety.

TECHNICAL FIELD

The disclosure relates to a base station for detecting abnormality of cell coverage and operating method thereof.

BACKGROUND ART

A wireless communication system may include a plurality of base stations (e.g., evolved node base station (eNB) or next generation node base station (gNB)) forming a wireless link with a user equipment (UE). Each base station may form a cell coverage of a certain size for forming a wireless link with at least one user terminal. The cell coverage may indicate a range in which communication between a base station and a UE is valid in the wireless communication system.

The above information is presented as background information only to assist with an understanding of the disclosure. No determination has been made, and no assertion is made, as to whether any of the above might be applicable as prior art with regard to the disclosure.

DISCLOSURE

Technical Problem

The wireless communication system may control each base station to form pre-planned cell coverage so that communication quality of the wireless communication system is not reduced due to interference between cell coverage formed by a plurality of base stations.

The cell coverage formed by the base station may generate an abnormal area different from the cell coverage planned by the actual wireless environment. For example, the abnormal area may comprise overshooting coverage that is formed relatively larger than planned cell coverage and/or island coverage that is formed in an area outside the planned cell coverage.

In a wireless communication system, an abnormal area different from the planned cell coverage may generate unnecessary handover (e.g., ping-pong handover) or cause interference with other cell coverage, thereby reducing the communication quality of the wireless communication system.

Aspects of the disclosure are to address at least the above-mentioned problems and/or disadvantages and to provide at least the advantages described below. Accordingly, an aspect of the disclosure is to provide a device and a method for detecting abnormality of cell coverage in a base station of a wireless communication system.

Additional aspects will be set forth in part in the description which follows and, in part, will be apparent from the description, or may be learned by practice of the presented embodiments.

Technical Solution

In accordance with an aspect of the disclosure, a base station is provided. The base station includes a communication interface, a memory, and a processor operatively coupled to the communication interface and the memory. The processor is configured to obtain information related to an abnormal area from a network management device. The processor is configured to identify, in a case in which a user equipment (UE) handovers from another base station to the base station, whether the abnormal area is provided by the other base station based on the information related to the abnormal area. The processor is configured to detect, in a case in which the abnormal area is provided by the other base station, whether cell coverage of the base station is affected by the abnormal area provided by the other base station, based on information related to timing advance (TA) of the other base station.

In accordance with another aspect of the disclosure, a method performed by a base station is provided. The method includes obtaining information related to an abnormal area from a network management device. The method comprises identifying, in a case in which a UE handovers from other base station to the base station, whether the abnormal area is provided by the other base station based on the information related to the abnormal area. The method comprises detecting, in a case in which the abnormal area is provided by the other base station, whether cell coverage of the base station is affected by the abnormal area provided by the other base station, based on information related to TA of the other base station.

Advantageous Effects

According to various embodiments of the disclosure, when a UE handovers from another base station in a base station of a wireless communication system, an affect to a cell coverage of the base station caused by an abnormal area of the other base station can be analyzed and resolved by detecting the affect to the cell coverage of the base station caused by the abnormal area of the other base station based on information related to TA of other base station.

Other aspects, advantages, and salient features of the disclosure will become apparent to those skilled in the art from the following detailed description, which, taken in conjunction with the annexed drawings, discloses various embodiments of the disclosure.

DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
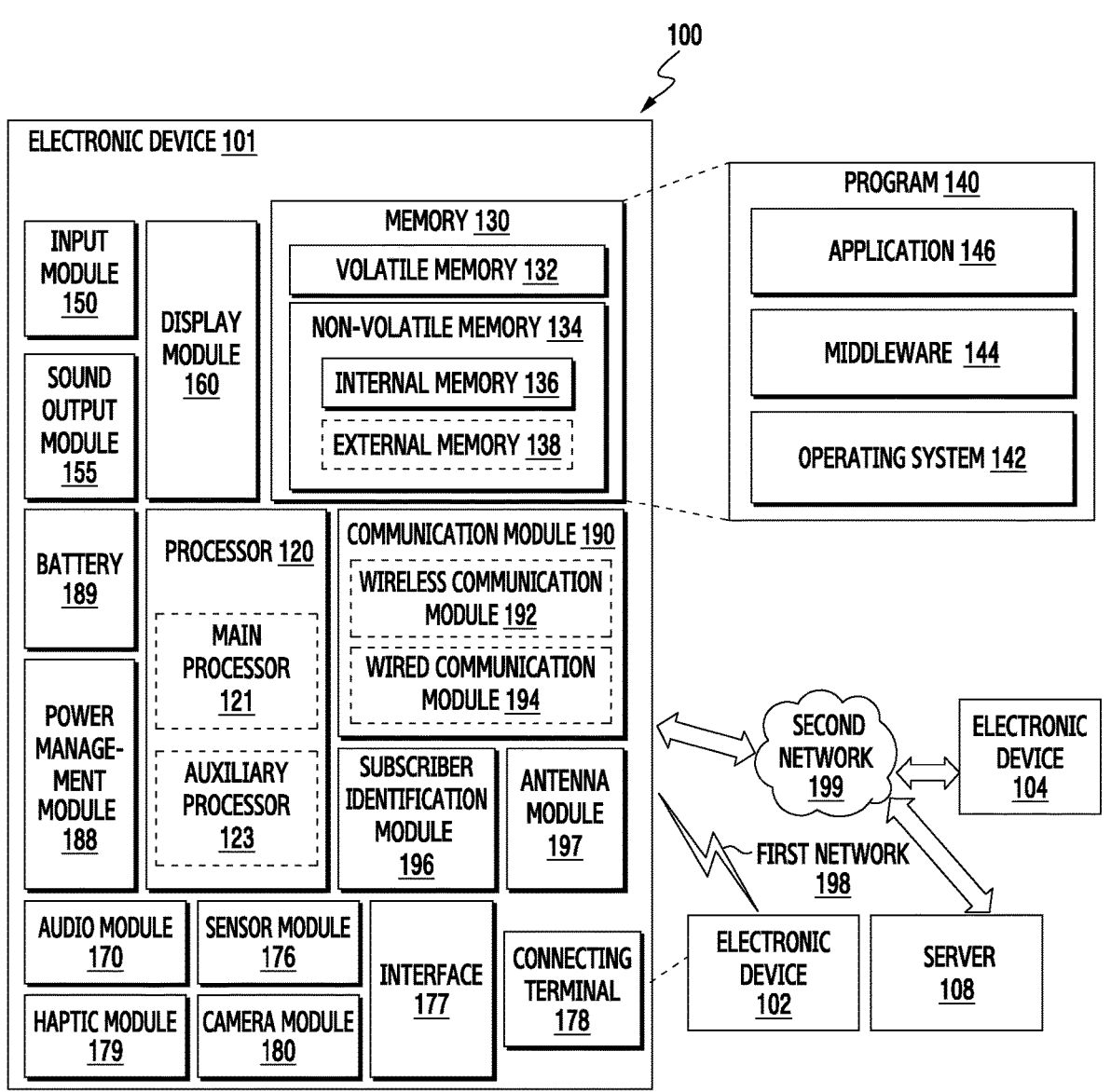
FIG. 1 is a block diagram of an electronic device in a network environment, according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5th generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4th generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD- MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
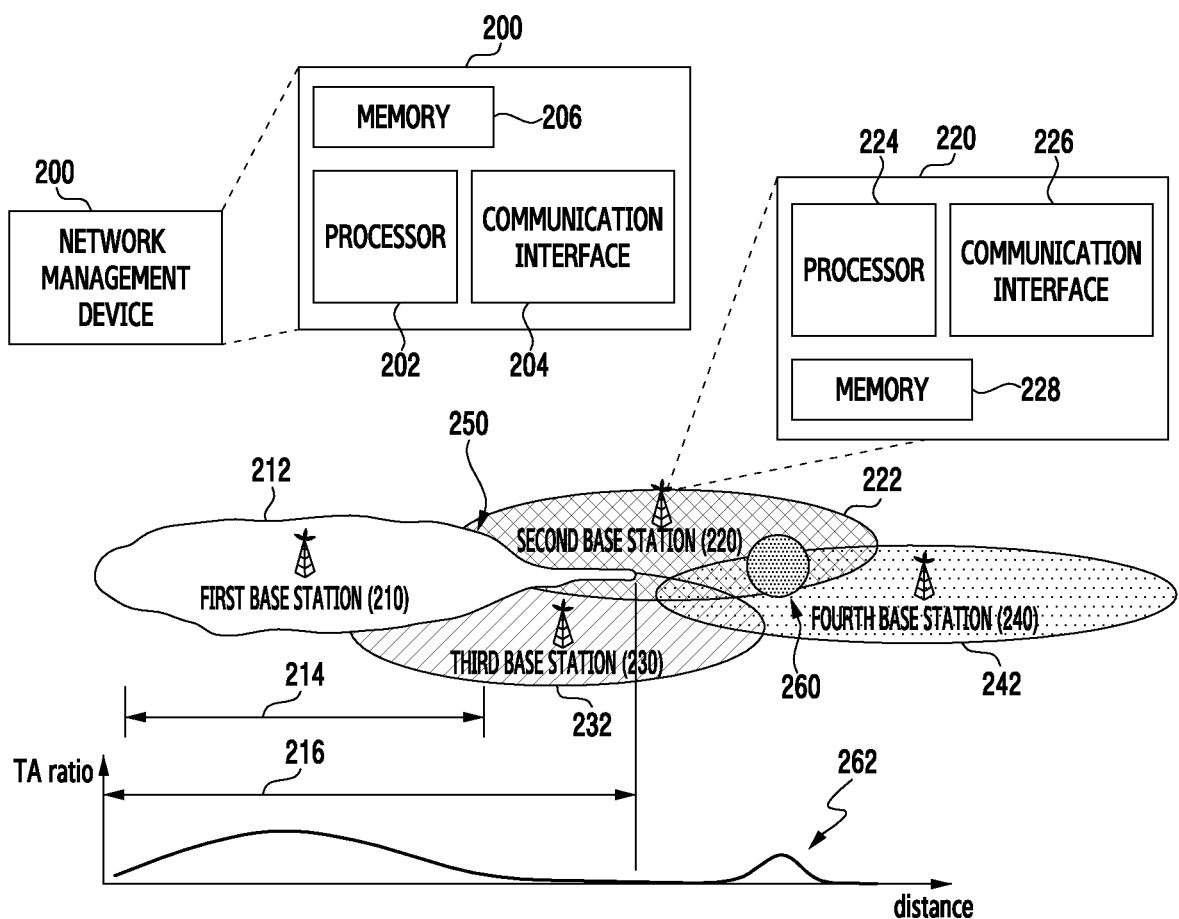
FIG. 2 is an example of a wireless communication system for detecting an abnormal area of cell coverage according to an embodiment of the disclosure.

FIG. 2 is an example of a wireless communication system for detecting an abnormal area of cell coverage according to an embodiment of the disclosure.

In the following description, the base station may include eNB and/or gNB as network elements for wireless communication with a user equipment (UE) in a wireless communication system.

Referring to FIG. 2, the wireless communication system may comprise a network management device 200 and/or a plurality of base stations 210, 220, 230, and/or 240.

According to various embodiments, the base station 1 210 may form a cell coverage 1 212 for forming a wireless link with at least one UE. For example, the cell coverage 1 212 is an area (or service area) in which the base station 1 210 and at least one UE is possible to transmit and/or receive data and/or signals, and may be referred to as a cell 1 operated by the base station 1 210. For example, the cell coverage 1 212 may be formed based on the size of the planned cell coverage 214 of the base station 1 210. For example, the cell coverage 1 212 may be formed to have substantially the same size as the planned cell coverage 214 of the base station 1 210. For example, the cell coverage 1 212 may be formed to be relatively smaller than the planned cell coverage 214 of the base station 1 210 by a designated size. For example, the cell coverage 1 212 may be formed to be relatively larger than the planned cell coverage 214 of the base station 1 210 by a designated size.

According to various embodiments, the base station 2 220 may form a cell coverage 2 222 for forming a wireless link with at least one UE. For example, the cell coverage 2 222 is an area (or service area) in which the base station 2 220 and at least one UE is possible to transmit and/or receive data and/or signals, and may be referred to as a cell 2 operated by the base station 2 220.

According to various embodiments, the base station 3 230 may form a cell coverage 3 232 for forming a wireless link with at least one UE. For example, the cell coverage 3 232 is an area (or service area) in which the base station 3 230 and at least one UE is possible to transmit and/or receive data and/or signals, and may be referred to as a cell 3 operated by the base station 3 230.

According to various embodiments, the base station 4 240 may form a cell coverage 4 242 for forming a wireless link with at least one UE. For example, the cell coverage 4 242 is an area (or service area) in which the base station 4 240 and at least one UE is possible to transmit and/or receive data and/or signals, and may be referred to as a cell 4 operated by the base station 4 240.

According to various embodiments, the network management device 200 may manage at least one network element (e.g., base station 1 210, base station 2 220, base station 3 230, and/or base station 4 240) composing a wireless communication system. For example, the network management device 200 may comprise an element management system (EMS). According to an embodiment, the network management device 200 may comprise a processor 202, a communication interface 204, and/or a memory 206.

According to various embodiments, the processor 202 of the network management device 200 may obtain information related to a cell operated by each of the base stations 210, 220, 230, or 240. For example, the cell-related information may comprise information related to planned cell coverage 214 related to each base station 210, 220, 230, or 240, neighboring cells of each base station 210, 220, 230, or 240, and/or maximum continuous coverage 216. For example, the maximum continuous coverage 216 may comprise an area in which a TA of a UE located in a cell (or cell coverage) operated by the base station (e.g., base station 1 210) exceeds a continuously designated reference value.

According to an embodiment, the processor 202 may obtain information related to the planned cell coverage 214 of each base station 210, 220, 230, or 240 from a separate device operating the base station 210, 220, 230, and/or 240 and/or the base station 210, 220, 230, and/or 240. According to an embodiment, the processor 202 may obtain (or estimate) information related to the planned cell coverage 214 of each base station 210, 220, 230, or 240 based on location information of each base station 210, 220, 230, or 240 and/or antenna azimuth of each base station 210, 220, 230, or 240. For example, the processor 202 may detect an inter-cell distance based on location information and antenna azimuth of the base stations 210, 220, 230, and/or 240. The processor 202 may detect the planned cell coverage 214 of each base station 210, 220, 230, or 240 by applying a predefined weight to the inter-cell distance. For example, the inter-cell distance may be detected based on a distance between nearest base stations or an average of distances with a designated number of nearby base stations. For example, the designated number may indicate the number of base stations set to detect an inter-cell distance.

According to an embodiment, the processor 202 may detect the maximum continuous coverage 216 of each of the base station 210, 220, 230, or 240 based on TA statistics information of each of the base station 210, 220, 230, or 240 collected for a designated time. For example, the maximum continuous coverage 216 may be detected by applying a designated reference ratio (e.g., about 78 m) to a TA value at a point that becomes equal to or less than a designated reference value based on TA statistics information of each base station 210, 220, 230, or 240. For example, the designated reference ratio may indicate a ratio between a TA value and a distance. For example, the designated time may indicate a predesignated time range for detecting TA statistics of the base station.

According to various embodiments, the processor 202 of the network management device 200 may detect a base station (or cell) generating overshooting coverage based on the TA statistics information and the planned cell coverage of the base station 210, 220, 230 or 240. According to an embodiment, the processor 202 may detect a TA value for which a probability cumulative distribution function (CDF) of TA statistics information of the base station 210, 220, 230 or 240 is equal to or greater than a designated probability value. The processor 202 may detect the base station (or cell) generating the overshooting coverage 250 based on the detected length and the size of the planned cell coverage 214 by applying a designated reference ratio (e.g., about 78 m) to a TA value equal to or greater than the designated probability value. For example, in the base station (or cell) (e.g., base station 1 210) generating the overshooting coverage 250, the length detected by applying the designated reference ratio (e.g., about 78 m) to the TA value that is equal to or greater than the designated probability value may exceed the size of the planned cell coverage 214. For example, the TA value equal to or greater than the designated probability value may comprise the same value as the TA value at a point equal to or less than the designated reference value used to detect the maximum continuous coverage 216. For example, the overshooting coverage 250 may comprise an area formed relatively larger than the planned cell coverage.

According to various embodiments, the processor 202 of the network management device 200 may detect a base station (or cell) that generates island coverage based on TA statistics information and maximum continuous coverage 216 of the base station 210, 220, 230, or 240. According to an embodiment, the processor 202 may detect TA values exceeding a designated reference value based on TA statistics information of the base station 210, 220, 230, or 240. The processor 202 may detect a base station (or cell) generating the island coverage 260 based on the detected maximum length and the size of the maximum continuous coverage 216 by applying a designated reference ratio (e.g., about 78 m) to TA values exceeding the designated reference value. For example, in the base station (or cell) (e.g., base station 1 210) generating the island coverage 260, the maximum length 262 detected by applying the designated reference ratio (e.g., about 78 m) to the TA values that exceed the designated reference value may exceed the size of the maximum continuous coverage 216.

According to various embodiments, when detecting a base station (or cell) generating an abnormal area, the processor 202 of the network management device 200 may control the communication interface 204 to transmit information related to the occurrence of the abnormal area to a neighboring base station (or a cell) of the base station (or a cell) generating the abnormal area. According to an embodiment, when determining that an abnormal area has occurred in the base station 1, the processor 202 may control the communication interface 204 to transmit information related to the occurrence of the abnormal area of the base station 1 210 to a base station 2 220, a base station 3 230, and/or a base station 4 240 which is a neighboring base station of the base station 1 210. For example, the abnormal area may comprise overshoot coverage and/or island coverage as an area different from the planned cell coverage. For example, information related to the occurrence of the abnormal area may comprise identification information of the base station (or cell) generating the abnormal area, planned cell coverage, and/or information related to maximum continuous coverage.

According to various embodiments, when detecting a base station (or cell) generating an abnormal area, the processor 202 of the network management device 200 may control the communication interface 204 to report information related to the occurrence of the abnormal area to the communication provider (or operator).

According to various embodiments, the communication interface 204 may support communication between the network management device 200 and at least one network device (e.g., base station 1 210, base station 2 220, base station 3 230, and/or base station 4 240. According to an embodiment, the communication interface 204 may support wireless communication and/or wired communication.

According to various embodiments, the memory 206 may store various data used by at least one component (e.g., processor 202 and/or communication interface 204) of the network management device 200. According to an embodiment, the data may comprise information related to a cell operated by each of the base station 210, 220, 230, or 240. According to an embodiment, the memory 206 may store various instructions that may be executed through the processor 202.

According to various embodiments, the base station 2 220 may check whether cell coverage 2 222 is affected (or compromised) by the abnormal area generated by the base station 1 210. According to an embodiment, the base station 2 220 may comprise a processor 224, a communication interface 226, and/or a memory 228.

According to various embodiments, the processor 224 of the base station 2 220 may obtain TA information of the base station 1 210 when the UE performs handover from the base station 1 210. According to an embodiment, the processor 224 may obtain TA information of the base station 1 210 from a signal related to a handover request received from the base station 1 210 through the communication interface 226. For example, the TA information of the base station 1 210 may comprise a TA value last measured (or reported) by at least one UE (e.g., a UE handover from the base station 1 210 to the base station 2 220) included in the cell coverage 212 of the base station 1 210. For example, the handover may comprise a series of procedures for moving the serving base station (or serving cell) of the UE.

According to various embodiments, the processor 224 of the base station 2 220 may identify whether the abnormal area is generated by the base station 1 210 based on information related to the occurrence of the abnormal area obtained from the network management device 200. According to an embodiment, the processor 224 may determine that an abnormal area is generated by the base station 1 210 when identification information of the base station 1 210 is included in identification information of the at least one base station that generates the abnormal area obtained from the network management device 200.

According to various embodiments, when determining that an abnormal area is generated by the base station 1 210, the processor 224 of the base station 2 220 may identify whether the cell coverage 2 222 is affected (or compromised) by the abnormal area generated by the base station 1 210 based on the TA information of the base station 1. For example, the processor 224 may determine whether the cell coverage 2 222 of the base station 2 220 is affected (or compromised) by an abnormal area generated by the base station 1. According to an embodiment, when a length detected by applying a reference ratio (e.g., about 78 m) designated to TA information (or TA value) of the base station 1 210 exceeds the size of the planned cell coverage 214 of the base station 1 210, the processor 224 may determine that the cell coverage 2 222 of the base station 2 220 is affected (or compromised) by the overshooting coverage 250 of the base station 1 210. According to an embodiment, when a length detected by applying a reference ratio (e.g., about 78 m) specified in TA information (or TA value) of the base station 1 210 exceeds a size of the maximum continuous coverage 216 of the base station 1 210, the processor 224 may determine that the cell coverage 2 222 of the base station 2 220 is affected (or damaged) by the island coverage 260 of the base station 1. For example, information related to the planned cell coverage 214 and/or the maximum continuous coverage 216 of the base station 1 210 may be comprised in information related to occurrence of an abnormal area obtained from the network management device 200.

According to various embodiments, when determining that the cell coverage 2 222 of the base station 2 220 is affected (or compromised) by the abnormal area of the base station 1 210, the processor 224 of the base station 2 220 may control the communication interface 226 to transmit information related to an affect (or compromise) to the cell coverage 2 222 of the base station 2 220 caused by the abnormal area to the network management device 200 and/or the base station (e.g., the base station 1 210) generating the abnormal area.

According to various embodiments, the communication interface 226 may support communication between the base station 2 220 and the network management device 200 and/or other base station (e.g., the base station 1 210, the base station 3 230, and/or the base station 4 240. According to an embodiment, the communication interface 226 may support wireless communication and/or wired communication.

According to various embodiments, the memory 228 may store various data used by at least one component (e.g., the processor 224 and/or the communication interface 226) of the base station 2 220. According to an embodiment, the data may comprise information related to the occurrence of an abnormal area obtained from the network management device 200 and/or TA information of other base station (e.g., base station 1 210). According to an embodiment, the memory 228 may store various instructions that may be executed through the processor 202.

According to various embodiments, the composition and/ or operation for identifying whether the cell coverage 3 232 of the base station 3 230 and the cell coverage 4 242 of the base station 4 240 receive an affect from (or is compromised by) the abnormal area generated by the base station 1 210 may be the same as or similar to that of the base station 2 220. Accordingly, detailed descriptions of the base station 3 230 and the base station 4 240 are omitted to avoid overlapping description with the base station 2 220.

According to various embodiments, when receiving information from the base station 2 220 related to an affect (or compromise) to the cell coverage 2 222 of the base station 2 220 due to an abnormal area, the network management device 200 may control the base station 1 210 to control an antenna azimuth and/or transmission power of the base station 1 210 corresponding to the direction of the base station 2 220.

According to various embodiments, when receiving information from the network management device 200 and/or the base station 220 related to an affect (or compromise) to the cell coverage 2 222 of the base station 2 220 due to an abnormal area, the base station 1 210 may control an antenna azimuth and/or transmission power of the base station 1 210 corresponding to the direction of the base station 220.

According to various embodiments, base station (e.g., base station 2 220 of FIG. 2) may comprise a communication interface (e.g., communication module 190 of FIG. 1 or communication interface 226 of FIG. 2); a memory (memory 130 of FIG. 1 or memory 228 of FIG. 2); and a processor (processor 120 of FIG. 1 or processor 224 of FIG. 2) operatively coupled to the communication interface and the memory. The processor is configured to identify, in a case in which a UE handovers from another base station to the base station, whether the abnormal area is provided by the other base station based on the information related to the abnormal area. The processor is configured to detect, in a case in which the abnormal area is provided by the other base station, whether cell coverage of the base station is affected by the abnormal area provided by the other base station, based on information related to timing advance (TA) of the other base station.

In some embodiments, the abnormal area comprises at least one of overshooting coverage or island coverage of the other base station.

In some embodiments, the processor is further configured to determine, in a case in which a length corresponding to the TA of the other base station exceeds a size of a planned cell coverage of the other base station, that the cell coverage of the base station is affected by the overshooting coverage.

In some embodiments, the processor is further configured to determine, in a case in which a length corresponding to the TA of the other base station exceeds a size of a maximum continuous coverage of the other base station, that the cell coverage of the base station is affected by the island coverage.

In some embodiments, the information related to the abnormal area includes identification information of a base station providing the abnormal area, and information related to at least one of a planned cell coverage of the base station providing the abnormal area, or a maximum continuous coverage of the base station providing the abnormal area.

In some embodiments, the processor is, to identify whether the abnormal area is provided by the other base station, further configured to identify whether the abnormal area is provided by the other base station, based on the identification information of the base station providing the abnormal area included in the information related to the abnormal area.

In some embodiments, the processor is, to detect whether the cell coverage of for the base station is affected by the abnormal area provided by the other base station, further configured to obtain the information related to the TA of the other base station from a request signal related to a handover of the user equipment received from the other base station.

In some embodiments, the processor is, to detect whether the cell coverage of the base station is affected by the abnormal area provided by the other base station, further configured to obtain the information related to the TA of the other base station via an internal interface with the other base station.

In some embodiments, the processor is further configured to transmit, in a case in which it is detected that the cell coverage of based station is affected, information related to the affect to the cell coverage of the base station caused by the abnormal area to at least one of the network management device or the other base station.

In some embodiments, the network management device comprises an EMS.

Figure 3:
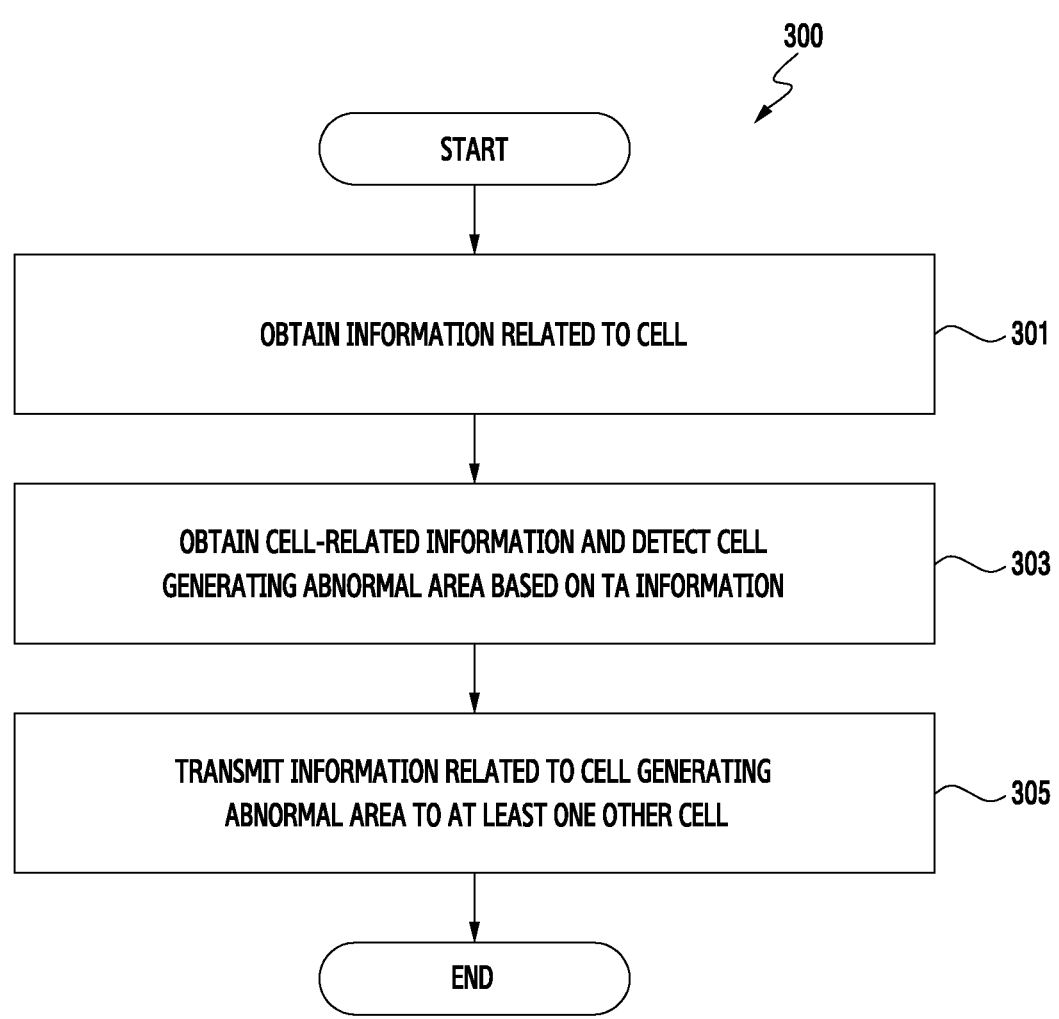
FIG. 3 is a flowchart for detecting a cell that generates an abnormal area in a network management device according to an embodiment of the disclosure.

FIG. 3 is a flowchart 300 for detecting a cell that provided an abnormal area in a network management device according to an embodiment of the disclosure.

In the following embodiment, each operation may be sequentially performed, but is not necessarily performed sequentially. For example, the order of each operation may be changed, and at least two operations may be performed in parallel. For example, the network management device of FIG. 3 may be the electronic device 101 of FIG. 1 or the network management device 200 of FIG. 2.

Referring to FIG. 3, in operation 301, the network management device (e.g., processor 120 of FIG. 1 or processor 202 of FIG. 2) may obtain information related to cell of each of the base station 210, 220, 230, or 240 managed by the network management device 200. For example, the cell-related information may comprise information related to planned cell coverage 214 related to each of the base station 210, 220, 230, or 240, neighboring cells of each of the base station 210, 220, 230, or 240, and/or maximum continuous coverage 216. For example, the maximum continuous coverage 216 may comprise an area in which a TA of a UE located in a cell (or cell coverage) operated by the base station (e.g., base station 1 210) exceeds a continuously designated reference value. According to an embodiment, the information related to the planned cell coverage 214 may be received from a separate device operating the base station 210, 220, 230, and/or 240 and/or the base station 210, 220, 230, and/or 240. According to an embodiment, the information related to the planned cell coverage 214 may be obtained (or estimated) based on location information of each base station 210, 220, 230, or 240 and/or an antenna azimuth of each base station 210, 220, 230, or 240. According to an embodiment, the maximum continuous coverage 216 may be detected based on TA statistics information of each base station 210, 220, 230, or 240 collected for a designated time.

According to various embodiments, in operation 303, the network management device (e.g., processor 120 or 202) may detect a base station that causes an abnormal area based on information related to cell of each of the base station 210, 220, 230, or 240 managed by the network management device 200. For example, the abnormal area may comprise overshooting coverage that is formed to be relatively larger than planned cell coverage and/or island coverage that is formed in at least a partial area outside the planned cell coverage. According to an embodiment, the processor 202 may detect a base station (or cell) that generates overshooting coverage 250 based on the detected length and the size of the planned cell coverage 214 by applying a designated reference ratio (e.g., about 78 m) in the TA value at which the probability cumulative distribution function (CDF) of the TA statistics information of the base station 210, 220, 230 or 240 is equal to or greater than the designated probability value. For example, when the length detected by applying the designated reference ratio to the TA value that is equal to or greater than the designated probability value of the base station 1 210 exceeds the size of the planned cell coverage 214, the processor 202 may determine that the overshooting coverage 250 is provided by the base station 1 210. According to an embodiment, the processor 202 may detect a base station (or cell) that generates the island coverage 260 based on the maximum length detected and the size of the maximum continuous coverage 216 by applying the designated reference ratio (e.g., about 78 m) to the TA values exceeding the designated reference value based on the TA statistics information of the base station 210, 220, 230 or 240. For example, when the maximum length 262 detected by applying a designated reference ratio (e.g., about 78 m) to TA values exceeding the designated reference value of the base station 1 210 exceeds the size of the maximum continuous coverage 216, the processor 202 may determine that the island coverage 260 is provided by the base station 210.

According to various embodiments, in operation 305, the network management device (e.g., processor 120 or 202) may transmit information related to occurrence of the abnormal area to a neighboring base station (or cell) of the base station (or cell) providing the abnormal area. According to an embodiment, when determining that an abnormal area has occurred in the base station 1 210, the processor 202 may control the communication interface 204 to transmit information related to the occurrence of the abnormal area of the base station 1 210 to a base station 2 220, a base station 3 230, and/or a base station 4 240 which is a neighboring base station of the base station 1 210. For example, the information related to the occurrence of the abnormal area may comprise identification information of the base station (or cell) providing the abnormal area, planned cell coverage, and/or information related to maximum continuous coverage.

According to various embodiments, when detecting a base station (or cell) providing an abnormal area, the network management device 200 may report information related to the occurrence of the abnormal area to the communication provider (or operator).

Figure 4:
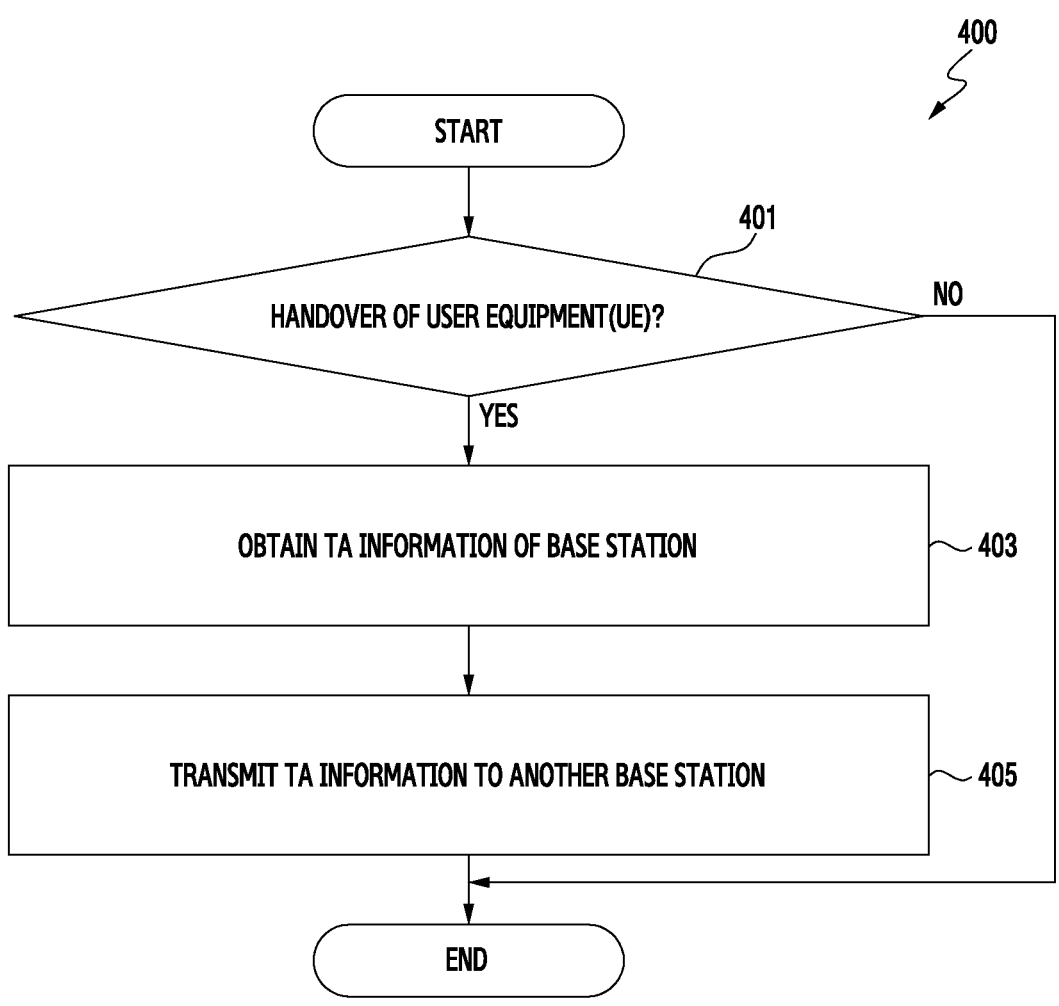
FIG. 4 is a flowchart for sharing timing advance (TA) information in a base station according to an embodiment of the disclosure.

FIG. 4 is a flowchart 400 for sharing TA information in a base station according to an embodiment of the disclosure.

In the following embodiment, each operation may be sequentially performed, but is not necessarily performed sequentially. For example, the order of each operation may be changed, and at least two operations may be performed in parallel. For example, the base station of FIG. 4 may be the electronic device 101 of FIG. 1 or the base station 1 210 of FIG. 2.

Referring to FIG. 4, in operation 401, the base station (e.g., base station 1 210 of FIG. 2) may identify whether handover of at least one UE included in cell coverage (e.g., cell coverage 1 212) of the base station (e.g., base station 1 210) is triggered. According to an embodiment, when receiving a signal related to a handover request from the UE, the base station 1 210 may determine that the handover of at least one UE is triggered. According to an embodiment, the base station 1 210 may determine whether to handover at least one UE based on wireless state information (e.g., reception signal intensity) received from the UE. For example, when the reception signal intensity between the UE and the base station 1 210 and the reception signal intensity between the UE and another base station (e.g., base station 2 220) satisfy the designated handover condition, the base station 1 210 may determine that the handover of at least one UE is triggered. For example, the state satisfying the designated handover condition may comprise a state in which the reception signal intensity between the UE and other base station (e.g., base station 2 220) exceeds the reception signal intensity between the UE and the base station 1. For example, the state satisfying the designated handover condition may comprise a state in which the reception signal intensity between the UE and the base station 1 210 is less than the designated first reference intensity and the reception signal intensity between the UE and other base station (e.g., base station 2 220) exceeds the designated second reference intensity. For example, the designated second reference intensity is a value different from the designated first reference intensity, and may be set higher than the designated first reference intensity.

According to various embodiments, when handover of the UE is not triggered (e.g., 'no' in operation 401), the base station (e.g., base station 1 210) may terminate an embodiment for sharing TA information.

According to various embodiments, in operation 403, when a handover of the UE is triggered (e.g., 'yes' in operation 401), the base station (e.g., base station 1 210) may identify TA information of the base station. For example, the TA information of the base station may comprise a TA value last measured (or reported) by at least one UE (e.g., UE handover from the base station 1 210 to the base station 2 220) comprised in the cell coverage 212 of the base station 1 210.

According to various embodiments, in operation 405, the base station (e.g., base station 1 210) may transmit TA information of the base station to other base station (e.g., base station 2 220) that the UE handover. According to an embodiment, the base station 1 210 may transmit TA information of the base station 1 210 to the base station 2 220 through an internal interface with the base station 2 220. According to an embodiment, the base station 1 210 may transmit TA information of the base station 1 210 to the base station 2 220 through a signal related to the handover request. For example, the signal related to the handover request may comprise X2 handover request message defined in the standard (e.g., technical specification (TS) 36.423), S1 handover request messages defined in the standard (e.g., TS 36.413), Xn handover request messages defined in the standard (e.g., TS 38.423), or NG handover request messages defined in the standard (e.g., TS 38.413).

Figure 5:
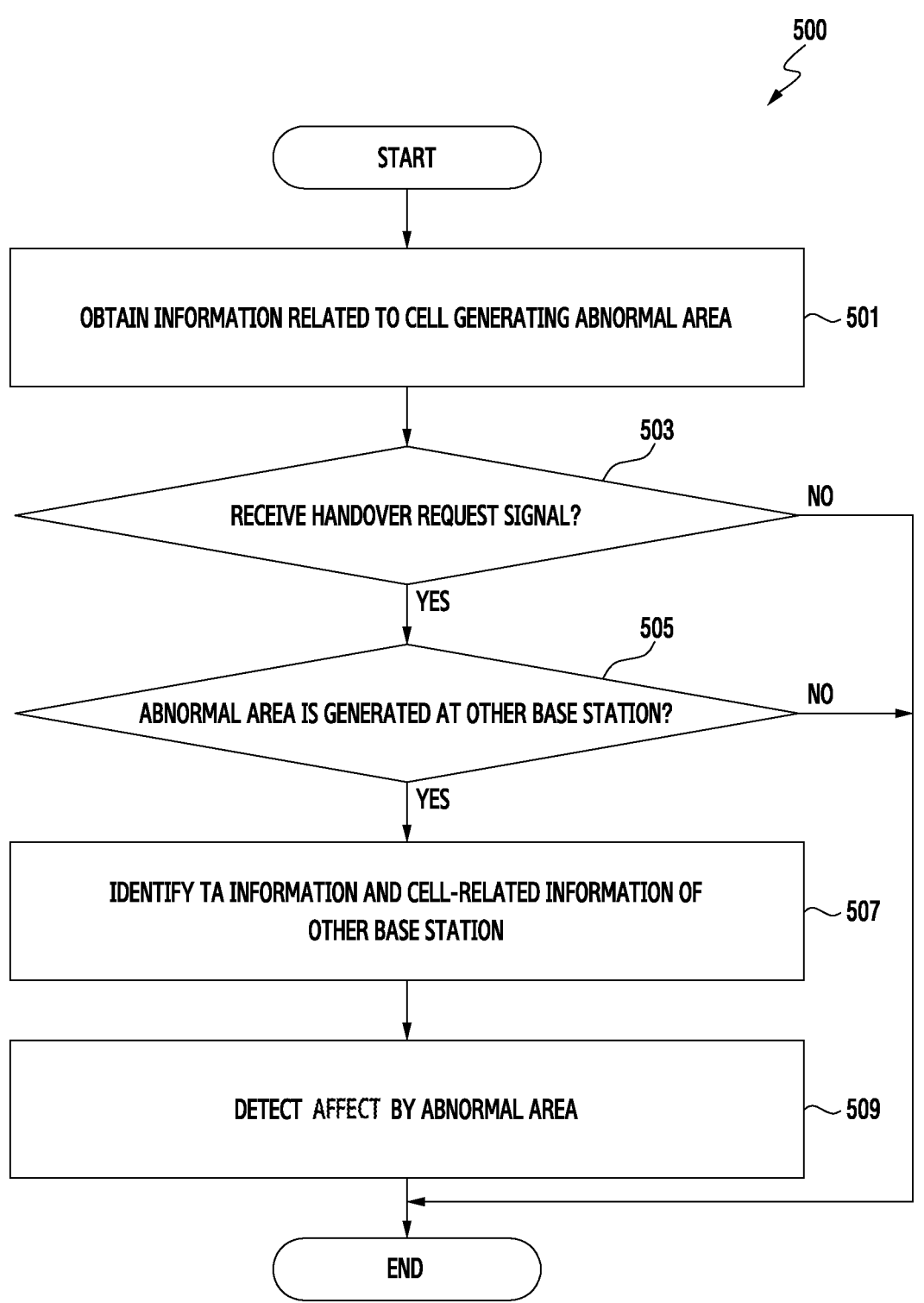
FIG. 5 is a flowchart for detecting an affect to cell coverage of a base station caused by an abnormal area of another base station according to an embodiment of the disclosure.

FIG. 5 is a flowchart 500 for detecting an affect to cell coverage area of a base station caused by an abnormal area of another base station according to an embodiment of the disclosure.

In the following embodiment, each operation may be sequentially performed, but is not necessarily performed sequentially. For example, the order of each operation may be changed, and at least two operations may be performed in parallel. For example, the base station of FIG. 6 may be the electronic device 101 of FIG. 1 or the base station 2 220 of FIG. 2.

Referring to FIG. 5, in operation 501, the base station (e.g., processor 120 of FIG. 1 or processor 224 of FIG. 2) may obtain information related to cell for the abnormal area from the network management device 200. For example, the information related to the occurrence of the abnormal area may comprise information related to identification information of the base station (or cell) providing the abnormal area, planned cell coverage, and/or maximum continuous coverage.

According to various embodiments, in operation 503, the base station (e.g., processor 120 or 224) may identify whether a handover request signal is received from other base station (e.g., base station 1 210) or not. For example, the handover request signal comprises a radio resource control (RRC) reconfiguration message including information element (IE) indicating a handover command According to an embodiment, when receiving a signal related to a handover request from the base station 1 210 through the communication interface 226, the processor 224 may determine that the UE handover from the cell coverage 1 212 of the base station 1 210 to the cell coverage 2 222 of the base station 2 220.

According to various embodiments, in operation 505, when receiving a signal related to a handover request from other base station (e.g., base station 1 210) (e.g., 'yes' in operation 503), the base station (e.g., processor 120 or 224) may identify whether an abnormal area is provided by other base station. In other words, the base station may identify whether the abnormal area occurs at the other base station or not. According to an embodiment, when identification information of the base station 1 210 is comprised in identification information of at least one base station that provided an abnormal area obtained from the network management device 200, the processor 224 may determine that an abnormal area is provided by the base station 1 210. According to an embodiment, when the identification information of the base station 1 210 is not comprised in the identification information of the at least one base station that provides the abnormal area obtained from the network management device 200, the processor 224 may determine that the abnormal area is not provided by the base station 1.

According to various embodiments, when determining that a signal related to a handover request is not received from other base station (e.g., base station 1 210) (e.g., 'no' in operation 503) or that an abnormal area does not occur in other base station (e.g., 'no' in operation 505), the base station (e.g., processor 120 or 224) may terminate an embodiment for detecting an affect caused by an abnormal area of another base station.

According to various embodiments, in operation 507, when determining that an abnormal area is occurred in other base station (e.g., 'yes' in operation 505), the base station (e.g., the processor 120 or 224) may identify TA information of other base station and cell-related information of other base station. For example, TA information of other base station may be obtained from a request signal related to handover received from other base station. For example, cell-related information of other base station may be obtained from information related to occurrence of an abnormal area received from the network management device 200.

According to various embodiments, in operation 509, the base station (e.g., processor 120 or 224) may detect whether cell coverage is affected (or compromised) by an abnormal area of another base station (e.g., base station 1 210) based on the TA information of other base station (e.g., base station 1 210) and cell-related information of the other base station. According to an embodiment, when a length detected by applying a designated reference ratio (e.g., about 78 m) to TA information (or TA value) of the base station 1 210 exceeds the size of the planned cell coverage 214 of the base station 1 210, the processor 224 may determine that the cell coverage 2 222 of the base station 2 220 is affected (or compromised) by the overshooting coverage 250 of the base station 1 210. According to an embodiment, when a length detected by applying a designated reference ratio (e.g., about 78 m) to TA information (or TA value) of the base station 1 210 exceeds a size of the maximum continuous coverage 216 of the base station 1 210, the processor 224 may determine that the cell coverage 2 222 of the base station 2 220 is affected (or compromised) by the island coverage 260 of the base station 1 210.

According to various embodiments, when determining that it is affected (or compromised) by an abnormal area of another base station (e.g., base station 1 210), the base station (e.g., base station 2 220) may transmit information related to an affect (or compromise) caused by the abnormal area to the network management device 200 and/or the base station (e.g., base station 1 210) providing the abnormal area. According to an embodiment, when receiving information related to an affect (or compromise) due to an abnormal area from the base station 2 220, the network management device 200 may control the base station 1 210 to control the antenna azimuth and/or transmission power of the base station 1 210 corresponding to the direction of the base station 220. According to an embodiment, when receiving information related to the affect (or compromise) caused by the abnormal area of the base station 2 220 from the network management device 200 and/or the base station 2 220, the base station 1 210 may control an antenna azimuth and/or transmission power of the base station 1 210 corresponding to the direction of the base station 2 220.

According to various embodiments, a method performed by a base station comprises obtaining information related to an abnormal area from a network management device. The method comprises identifying, in a case in which a UE handovers from another base station to the base station, whether the abnormal area is provided by the other base station based on the information related to the abnormal area. The method comprises detecting, in a case in which the abnormal area is provided by the other base station, whether cell coverage of the base station is affected by the abnormal area provided by the other base station, based on information related to TA of the other base station.

In some embodiments, wherein the abnormal area comprises at least one of overshooting coverage or island coverage of the other base station.

In some embodiments, the method further comprises determining, in a case in which a length corresponding to the TA of the other base station exceeds a size of a planned cell coverage of the other base station, that the cell coverage of the base station is affected by the overshooting coverage generated by the other base station.

In some embodiments, the method further comprises determining, in a case in which a length corresponding to the TA of the other base station exceeds a size of a maximum continuous coverage of the other base station, that the cell coverage of the base station is affected by the island coverage generated by the other base station.

In some embodiments, the information related to the abnormal area includes identification information of a base station providing the abnormal area, and information related to at least one of a planned cell coverage of the base station providing the abnormal area, or the maximum continuous coverage of the base station providing the abnormal area.

In some embodiments, identifying whether the abnormal area is provided by the other base station comprises identifying whether the abnormal area is generated by the other base station, based on the identification information of the base station generating the abnormal area included in the information related to the abnormal area.

In some embodiments, the information related to the TA of the other base station is included in a request signal related to a handover of the user equipment received from the other base station.

In some embodiments, the information related to the TA of the other base station is obtained via an internal interface with the other base station from the other base station.

In some embodiments, the method further comprises transmitting, in a case in which it is detected that determining that the cell coverage of based station is affected, information related to the affect to the cell coverage caused by the abnormal area to at least one of the network management device or the other base station.

In some embodiments, the network management device comprises an EMS.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A first base station comprising:
a communication interface;
memory comprising one or more storage media storing instructions; and
at least one processor comprising processing circuitry,
wherein the instructions, when executed by the at least one processor individually or collectively, cause the first base station to:
obtain information related to an occurrence of an abnormal area from a network management device, wherein the abnormal area is different from a predefined area of cell coverage of a base station,
receive, from a second base station, a handover request signal including information related to timing advance (TA) of the second base station,
based on receiving the handover request signal,
identify whether the abnormal area is provided by the second base station in accordance with the information related to the occurrence of the abnormal area,
based on identifying that the abnormal area is provided by the second base station, detect whether cell coverage of the first base station is affected by the abnormal area provided by the second base station, in accordance with the information related to the TA of the second base station and the information related to the occurrence of the abnormal area, and
based on detecting that the cell coverage of the first base station is affected by the abnormal area provided by the second base station, cause to control the second base station to change a configuration related to the abnormal area provided by the second base station.

2. The first base station of claim 1, wherein the abnormal area provided by the second base station comprises at least one of overshooting coverage or island coverage.

3. The first base station of claim 2, wherein the instructions, when executed by the at least one processor individually or collectively, cause the first base station to:
determine, in a case in which a length corresponding to the TA of the second base station exceeds a size of a pre-defined cell coverage of the second base station, that the cell coverage of the first base station is affected by the overshooting coverage.

4. The first base station of claim 2, wherein the instructions, when executed by the at least one processor individually or collectively, cause the first base station to:

determine, in a case in which a length corresponding to the TA of the second base station exceeds a size of a maximum continuous coverage of the second base station, that the cell coverage of the first base station is affected by the island coverage.

5. The first base station of claim 1, wherein the information related to the occurrence of the abnormal area includes identification information of the second base station providing the abnormal area, and information related to at least one of a pre-defined cell coverage of the second base station providing the abnormal area, or a maximum continuous coverage of the second base station providing the abnormal area.

6. The first base station of claim 5, wherein the instructions, when executed by the at least one processor individually or collectively, cause the first base station to:

identify whether the abnormal area is provided by the second base station, based on the identification information of the second base station providing the abnormal area included in the information related to the occurrence of the abnormal area.

7. The first base station of claim 1, wherein the configuration related to the abnormal area provided by the second base station includes at least one of an antenna azimuth corresponding to a direction of the first base station or transmission power of the second base station.

8. The first base station of claim 1, wherein the instructions, when executed by the at least one processor individually or collectively, cause the first base station to:

obtain the information related to the TA of the second base station via an internal interface with the second base station.

9. The first base station of claim 1, wherein the instructions, when executed by the at least one processor individually or collectively, cause the first base station to:

based on detecting that the cell coverage of the first base station is affected by the abnormal area provided by the second base station, transmit information related to the affect to the cell coverage of the first base station caused by the abnormal area, to at least one of the network management device or the second base station, such that the second base station change the configuration related to the abnormal area provided by the second base station.

10. The first base station of claim 1, wherein the network management device comprises an element management system (EMS).

11. A method performed by a first base station, the method comprising:

obtaining information related to an occurrence of an abnormal area from a network management device, wherein the abnormal area is different from a pre-defined area of cell coverage of a base station, receiving, from a second base station, a handover request signal including information related to timing advance (TA) of the second base station, based on receiving the handover request signal, identifying whether the abnormal area is provided by the second base station in accordance with the information related to the occurrence of the abnormal area, based on identifying that the abnormal area is provided by the second base station, detecting whether cell coverage of the first base station is affected by the abnormal area provided by the second base station, in accordance with the information related to the TA of the second base station and the information related to the occurrence of the abnormal area, and based on detecting that the cell coverage of the first base station is affected by the abnormal area provided by the second base station, causing to control the second base station to change a configuration related to the abnormal area provided by the second base station.

12. The method of claim 11, wherein the abnormal area provided by the second base station comprises at least one of overshooting coverage or island coverage.

13. The method of claim 12, further comprising:

determining, in a case in which a length corresponding to the TA of the second base station exceeds a size of a pre-defined cell coverage of the second base station, that the cell coverage of the first base station is affected by the overshooting coverage.

14. The method of claim 12, further comprising:

determining, in a case in which a length corresponding to the TA of the second base station exceeds a size of a maximum continuous coverage of the second base station, that the cell coverage of the first base station is affected by the island coverage.

15. The method of claim 11, wherein the information related to the occurrence of the abnormal area includes identification information of the second base station providing the abnormal area, and information related to at least one of a pre-defined cell coverage of the second base station providing the abnormal area, or a maximum continuous coverage of the second base station providing the abnormal area.

16. The method of claim 15, further comprising:

identifying whether the abnormal area is provided by the second base station, based on the identification information of the second base station providing the abnormal area included in the information related to the occurrence of the abnormal area.

17. The method of claim 11, wherein the configuration related to the abnormal area provided by the second base station includes at least one of an antenna azimuth corresponding to a direction of the first base station or transmission power of the second base station.

18. The method of claim 11, further comprising:

obtaining the information related to the TA of the second base station via an internal interface with the second base station.

19. The method of claim 11, further comprising:

based on detecting that the cell coverage of the first base station is affected by the abnormal area provided by the second base station, transmitting information related to the affect to the cell coverage of the first base station caused by the abnormal area, to at least one of the network management device or the second base station, such that the second base station change the configuration related to the abnormal area provided by the second base station.

20. The method of claim 11, wherein the network management device comprises an element management system (EMS).

* * * * *